United States Patent
Tsukamoto

(10) Patent No.: US 10,375,639 B2
(45) Date of Patent: Aug. 6, 2019

(54) POWER TRANSMISSION APPARATUS FOR WIRELESSLY SUPPLYING POWER TO POWER RECEPTION APPARATUS

(71) Applicant: CANON KABUSHIKI KAISHA, Tokyo (JP)

(72) Inventor: Nobuyuki Tsukamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 256 days.

(21) Appl. No.: 15/297,976

(22) Filed: Oct. 19, 2016

(65) Prior Publication Data
US 2017/0118713 A1   Apr. 27, 2017

(30) Foreign Application Priority Data
Oct. 23, 2015   (JP) ................. 2015-209313

(51) Int. Cl.
| | |
|---|---|
| H01F 27/42 | (2006.01) |
| H01F 37/00 | (2006.01) |
| H01F 38/00 | (2006.01) |
| H04W 52/02 | (2009.01) |
| H04W 4/80 | (2018.01) |
| H04W 24/08 | (2009.01) |

(52) U.S. Cl.
CPC ......... *H04W 52/0235* (2013.01); *H04W 4/80* (2018.02); *H04W 24/08* (2013.01); *H04W 52/0261* (2013.01)

(58) Field of Classification Search
CPC ... H04W 4/08; H04W 24/08; H04W 52/0261; H04W 52/0235
See application file for complete search history.

(56) References Cited

U.S. PATENT DOCUMENTS

| | | | | |
|---|---|---|---|---|
| 6,060,976 | A * | 5/2000 | Yamaguchi | H01F 27/2804 336/200 |
| 6,502,031 | B2 * | 12/2002 | Uehara | G01C 21/28 180/167 |
| 9,360,456 | B2 * | 6/2016 | Miyamoto | H01F 5/003 |
| 9,692,238 | B2 * | 6/2017 | Matsumoto | H02J 7/025 |
| 9,892,846 | B2 * | 2/2018 | Bae | H01F 38/14 |
| 9,985,695 | B2 * | 5/2018 | Won | H04B 5/0037 |

(Continued)

FOREIGN PATENT DOCUMENTS

JP   2008-206231 A   9/2008

*Primary Examiner* — Alfonso Perez Borroto
*Assistant Examiner* — Esayas G Yeshaw
(74) *Attorney, Agent, or Firm* — Canon U.S.A., Inc. IP Division

(57) ABSTRACT

A power transmission apparatus includes a communication unit that executes communication with an electronic apparatus, a power transmission unit that wirelessly supplies power to the electronic apparatus, and a control unit that controls communication and power supply to be executed alternately, wherein the control unit adjusts communication power of the communication unit and transmission power of the power transmission unit and/or a length of a communication period and a length of a power transmission period, so that an average magnetic field intensity does not exceed a first magnetic field intensity in a predetermined region throughout the communication period of communication executed by the communication unit and the power transmission period of power transmission executed by the power transmission unit.

13 Claims, 13 Drawing Sheets

(56) References Cited

U.S. PATENT DOCUMENTS

| | | | | |
|---|---|---|---|---|
| 2010/0036773 A1* | 2/2010 | Bennett | ............. | G06Q 20/3674 |
| | | | | 705/67 |
| 2011/0127843 A1* | 6/2011 | Karaoguz | .......... | G06K 7/10207 |
| | | | | 307/104 |
| 2013/0088194 A1* | 4/2013 | Hunter | ................. | B60L 11/182 |
| | | | | 320/108 |
| 2015/0280448 A1* | 10/2015 | White, II | ................ | H02J 5/005 |
| | | | | 307/104 |
| 2016/0001663 A1* | 1/2016 | Chae | ...................... | B60L 1/006 |
| | | | | 307/9.1 |
| 2016/0099576 A1* | 4/2016 | Ho | ......................... | H02J 7/025 |
| | | | | 320/108 |

* cited by examiner

POWER TRANSMISSION APPARATUS FOR WIRELESSLY SUPPLYING POWER TO POWER RECEPTION APPARATUS

BACKGROUND

Field

Aspects of the present disclosure generally relate to a power transmission apparatus that can execute wireless power transmission.

Description of the Related Art

In recent years, a wireless power transmission system has been known, which includes a power transmission apparatus that can transmit power in a contactless state without using a connector, and an electronic apparatus that can charge a battery attached thereto using the power transmitted from the power transmission apparatus. In the above-described wireless power transmission system, the power transmission apparatus that transmits power to an electronic apparatus by using an electro-magnetic resonance phenomenon has been known. In order to transmit power in a contactless state, the power transmission apparatus has to properly control power transmission by detecting a foreign object such as a metallic object or a near field communication (NFC) device that is not regarded as a power transmission target. Japanese Patent Application Laid-Open No. 2008-206231 discusses a method for detecting a foreign object placed on a power transmission apparatus based on load variation.

However, with the conventional method for detecting a foreign object based on the load variation caused by a foreign object, the foreign object may not be detected if the load variation caused by the inserted foreign object cannot be distinguished from the load variation occurring in a charging period or a load modulation communication period. Therefore, in a case where the foreign object cannot be detected, heat can be generated from the foreign object because of the magnetic field to exert an influence on the foreign object.

SUMMARY

According to an aspect of the present disclosure, a power transmission apparatus includes a communication unit configured to execute communication with an electronic apparatus, a power transmission unit configured to wirelessly supply power to the electronic apparatus, and a control unit configured to control communication executed by the communication unit and power supply executed by the power transmission unit to be executed alternately, wherein the control unit adjusts communication power of the communication unit and transmission power of the power transmission unit and/or a length of a communication period and a length of a power transmission period so that an average magnetic field intensity does not exceed a first magnetic field intensity in a predetermined region throughout the communication period of communication executed by the communication unit and the power transmission period of power transmission executed by the power transmission unit.

Further features will become apparent from the following description of exemplary embodiments with reference to the attached drawings.

DESCRIPTION OF THE EMBODIMENTS

Hereinbelow, an exemplary embodiment will be described with reference to the appended drawings. While, the exemplary embodiment will be described below, it is to be understood that the invention is not limited to the disclosed exemplary embodiment.

Figure 1:
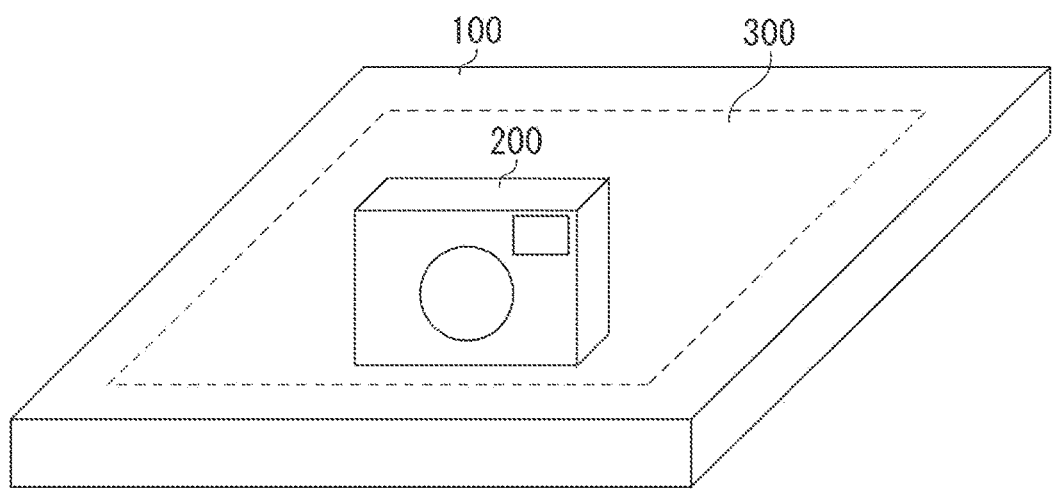
FIG. 1 is a diagram illustrating an example of constituent elements included in a wireless power transmission system according to a first exemplary embodiment.

As illustrated in FIG. 1, a wireless power transmission system according to a first exemplary embodiment includes a power transmission apparatus 100 and an electronic apparatus 200. In the wireless power transmission system according to the present exemplary embodiment, the power transmission apparatus 100 wirelessly transmits power to the electronic apparatus 200 when the electronic apparatus 200 is placed within a predetermined range 300 of the power transmission apparatus 100.

When the electronic apparatus 200 is placed in the predetermined range 300, the electronic apparatus 200 can wirelessly receive the power output from the power transmission apparatus 100. However, if the electronic apparatus 200 is not placed in the predetermined range 300, the electronic apparatus 200 cannot receive the power from the power transmission apparatus 100. Herein, the predetermined range 300 refers to a range in which the power transmission apparatus 100 can communicate with the electronic apparatus 200. In addition, although the predetermined range 300 is described as an area on a housing of the power transmission apparatus 100 in the present exemplary embodiment, the predetermined range 300 is not limited thereto. Further, the power transmission apparatus 100 can wirelessly transmit power to a plurality of electronic apparatuses.

The electronic apparatus 200 can be an imaging apparatus, a reproducing apparatus, or a communication apparatus such as a mobile phone or a smartphone. The electronic apparatus 200 can also be a battery pack including batteries. The electronic apparatus 200 can also be an automobile, a display device, or a personal computer.

Figure 2:
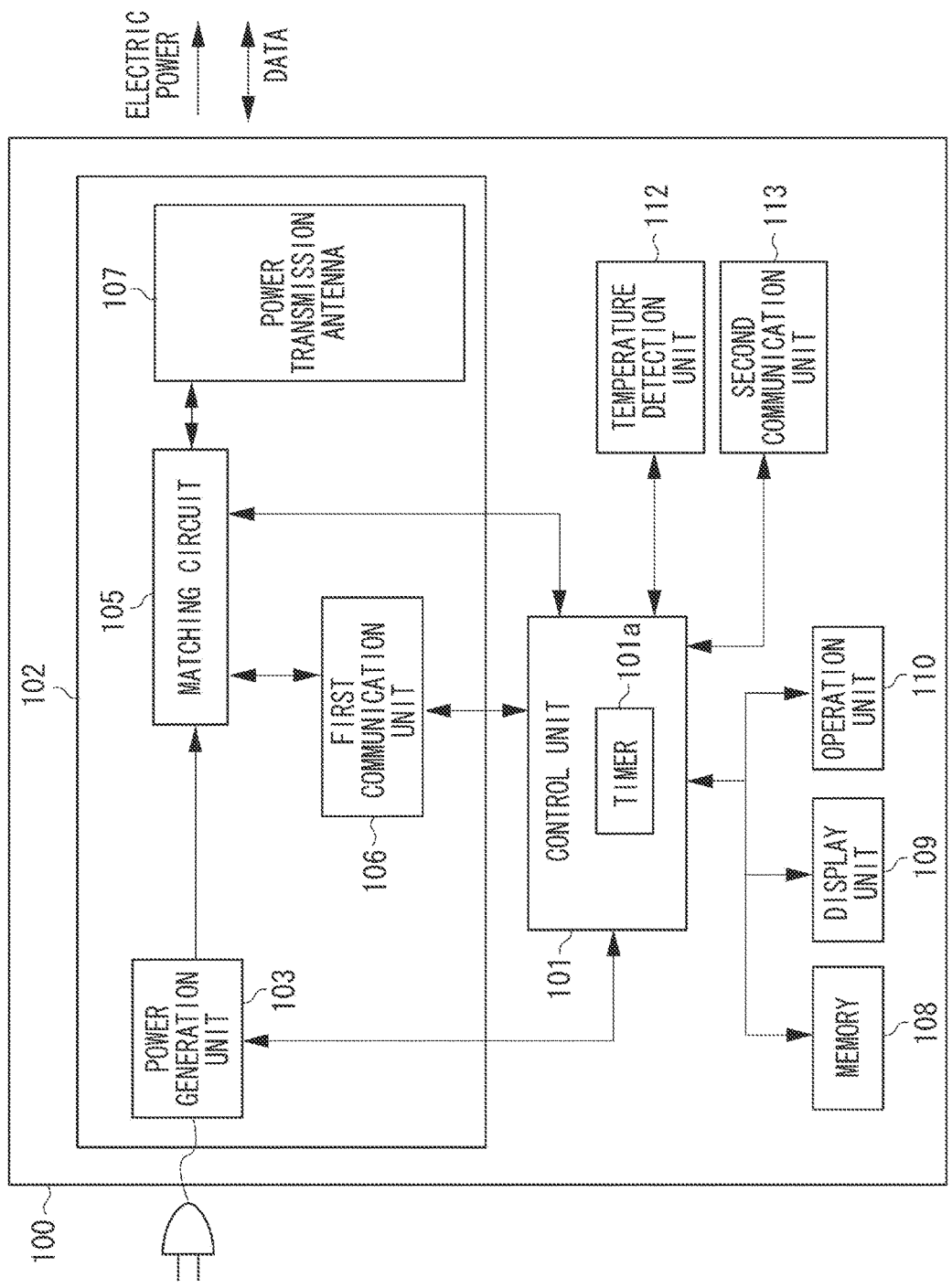
FIG. 2 is a block diagram illustrating an example of constituent elements included in a power transmission apparatus according to the first exemplary embodiment.

Next, an example of the constituent elements included in the power transmission apparatus 100 according to the present exemplary embodiment will be described with reference to FIG. 2. As illustrated in FIG. 2, the power transmission apparatus 100 includes a control unit 101, a power transmission unit 102, a memory 108, a display unit 109, an operation unit 110, a temperature detection unit 112, and a second communication unit 113. The power transmission unit 102 includes a power generation unit 103, a matching circuit 105, a first communication unit 106, and a power transmission antenna 107.

The control unit 101 controls the power transmission apparatus 100 by executing a computer program stored in the memory 108. For example, the control unit 101 includes a central processing unit (CPU) or a micro processing unit (MPU). In addition, the control unit 101 is configured of hardware. Further, the control unit 101 includes a timer 101a.

The power transmission unit 102 is used for carrying out wireless power transmission based on a predetermined power transmission method. For example, the predetermined power transmission method can be a power transmission method using a magnetic resonance method. The magnetic resonance method is a method for transmitting power from the power transmission apparatus 100 to the electronic apparatus 200 in a resonance state of the power transmission apparatus 100 and the electronic apparatus 200. The resonance state of the power transmission apparatus 100 and the electronic apparatus 200 is a state where a resonance frequency of the power transmission antenna 107 of the power transmission apparatus 100 and a resonance frequency of the power reception antenna 203 of the electronic apparatus 200 are matched with each other. The predetermined power transmission method can be a power transmission method other than the magnetic resonance method.

When the power transmission apparatus 100 is connected to an alternating-current (AC) power source (not illustrated), the power generation unit 103 generates power to be output external to the power transmission apparatus 100 via the power transmission antenna 107 by using the power supplied from the AC power source (not illustrated).

The power generation unit 103 generates communication power and transmission power. The communication power is used when the first communication unit 106 communicates with the electronic apparatus 200. For example, the communication power is weak power of 1 W or less. In addition, the communication power can be power specified by the communication standard of the first communication unit 106. The transmission power is used when the electronic apparatus 200 performs charging and specific operations. For example, the transmission power is power of 2 W or more. Further, the transmission power is not limited to the power of 2 W or more as long as the transmission power is greater than the communication power. A value of the transmission power is set by the control unit 101 based on data acquired from the electronic apparatus 200.

The power generated by the power generation unit 103 is supplied to the power transmission antenna 107 via the matching circuit 105.

The matching circuit 105 includes a circuit for setting a resonance frequency of the power transmission antenna 107 and a circuit for matching the impedance between the power generation unit 103 and the power transmission antenna 107.

When the power transmission apparatus 100 outputs any one of the communication power or the transmission power via the power transmission antenna 107, the control unit 101 controls the matching circuit 105 to set the resonance frequency of the power transmission antenna 107 to a predetermined frequency "f". For example, the predetermined frequency "f" can be 13.56 MHz. The predetermined frequency "f" can also be 6.78 MHz or a frequency specified by the communication standard of the first communication unit 106.

For example, the first communication unit 106 carries out wireless communication based on the NFC standard specified by the NFC forum. Furthermore, the communication standard of the first communication unit 106 can be the International Organization for Standardization/International Electro-Technical Communication 18092 (ISO/IEC 18092), ISO/IEC 14443, or ISO/IEC 21481 standard. When the communication power is output via the power transmission antenna 107, the first communication unit 106 can exchange data for carrying out wireless power transmission with the electronic apparatus 200 via the power transmission antenna 107. Hereinbelow, a period during which the communication power is output via the power transmission antenna 107 is referred to as "communication period".

In a period during which the transmission power is output via the power transmission antenna 107, the first communication unit 106 does not communicate with the electronic apparatus 200 via the power transmission antenna 107. Hereinbelow, a period during which the transmission power is output via the power transmission antenna 107 is referred to as "power transmission period". As described below, an amount of the communication power, a length of the communication period, an amount of the transmission power, and a length of the power transmission period are appropriately set by the control unit 101.

The data exchanged between the first communication unit 106 and the electronic apparatus 200 is data compliant with the NFC data exchange format (NDEF).

When the first communication unit 106 transmits the data compliant with the NDEF to the electronic apparatus 200, the first communication unit 106 executes processing of superimposing the data onto the communication power supplied from the power generation unit 103. The communication power onto which the data is superimposed is transmitted to the electronic apparatus 200 via the power transmission antenna 107.

When the first communication unit 106 receives the data compliant with the NDEF from the electronic apparatus 200, the first communication unit 106 detects an electric current flowing in the power transmission antenna 107 and receives the data from the electronic apparatus 200 according to a detection result of the electric current. This is because the electronic apparatus 200 transmits the data compliant with the NDEF to the power transmission apparatus 100 by fluctuating the internal load thereof. Because the electric current flowing in the power transmission antenna 107 is changed when the internal load of the electronic apparatus 200 is changed, the first communication unit 106 can receive the data compliant with the NDEF from the electronic apparatus 200 by detecting the electric current flowing in the power transmission antenna 107.

In addition, the first communication unit 106 operates as a reader/writer specified by the NFC standard.

The power transmission antenna 107 is an antenna for outputting any one of the communication power or the transmission power to the electronic apparatus 200. Further, the power transmission antenna 107 is used when the first communication unit 106 communicates with the electronic apparatus 200 through wireless communication based on the NFC standard.

The memory 108 stores a computer program for controlling the power transmission apparatus 100. The memory 108 stores the below-described power transmission status data, such as identification data of the power transmission device 100, power transmission parameters relating to the power transmission apparatus 100, and a flag for controlling the power transmission. The memory 108 stores data acquired by at least any one of the first communication unit 106 or the second communication unit 113 from the electronic apparatus 200. Power reception status data described below is included in the acquired data.

The display unit 109 displays a video image stored in the memory 108 or supplied from the second communication unit 113.

The operation unit 110 provides a user interface for operating the power transmission apparatus 100. The operation unit 110 includes buttons, switches, and a touch panel for operating the power transmission apparatus 100. The control unit 101 controls the power transmission apparatus 100 according to an input signal received via the operation unit 110.

The temperature detection unit 112 detects a temperature of the power transmission apparatus 100 and supplies data indicating the detected temperature to the control unit 101. In addition, the temperature of the power transmission apparatus 100 detected by the temperature detection unit 112 can be an internal temperature or a surface temperature of the power transmission apparatus 100.

The second communication unit 113 carries out wireless communication with the electronic apparatus 200 based on a communication standard different from the communication standard of the first communication unit 106. For example, the communication standard of the second communication unit 113 is a standard of a wireless local area network (LAN) or Bluetooth®. The second communication unit 113 enables transmission and reception of data including at least any one of video image data, audio data, and a command between the power transmission apparatus 100 and the electronic apparatus 200.

The power transmission apparatus 100 wirelessly supplies power to the electronic apparatus 200. However, the terms "in contactless state" or "in noncontact state" can be used in placed of the term "wirelessly".

Figure 3:
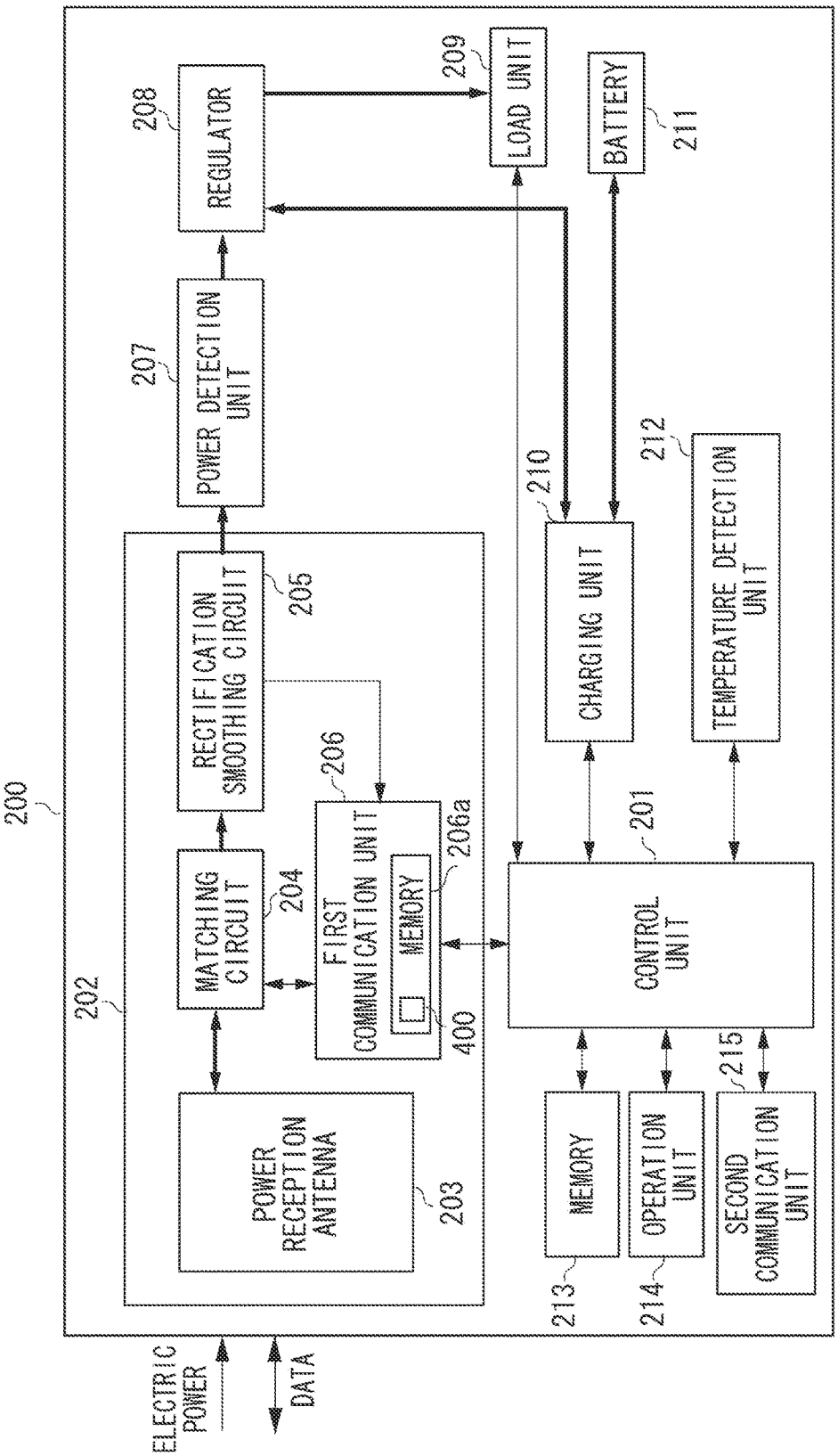
FIG. 3 is a block diagram illustrating an example of constituent elements included in an electronic apparatus according to the first exemplary embodiment.

Next, an example of the constituent elements included in the electronic apparatus 200 will be described with reference to FIG. 3. The electronic apparatus 200 includes a control unit 201, a power reception unit 202, a power detection unit 207, a regulator 208, a load unit 209, a charging unit 210, a battery 211, a temperature detection unit 212, a memory 213, an operation unit 214, and a second communication unit 215. The power reception unit 202 includes a power reception antenna 203, a matching circuit 204, a rectification smoothing circuit 205, and a first communication unit 206.

The control unit 201 controls the electronic apparatus 200 by executing a computer program stored in the memory 213. For example, the control unit 201 includes a CPU or an MPU. In addition, the control unit 201 is configured of hardware.

The power reception unit 202 complies with a predetermined power transmission method and wirelessly receives power from the power transmission apparatus 100.

The power reception antenna 203 is an antenna for receiving the power supplied from the power transmission apparatus 100. The power reception antenna 203 is used when the first communication unit 206 communicates with the power transmission apparatus 100 through wireless communication based on the NFC standard. The power received by the electronic apparatus 200 from the power transmission apparatus 100 via the power reception antenna 203 is supplied to the rectification smoothing circuit 205 via the matching circuit 204.

The matching circuit 204 includes a circuit for setting the resonance frequency of the power reception antenna 203. The control unit 201 can set the resonance frequency of the power reception antenna 203 by controlling the matching circuit 204.

The rectification smoothing circuit 205 generates a direct-current power from the power received through the power reception antenna 203. The rectification smoothing circuit 205 supplies the generated direct-current power to the regulator 208 via the power detection unit 207. In a case where data is superimposed on the power received via the power reception antenna 203, the rectification smoothing circuit 205 extracts the data from the power received via the power reception antenna 203 and supplies the extracted data to the first communication unit 206.

The first communication unit 206 communicates with the power transmission apparatus 100 based on the same communication standard as that of the first communication unit 106 included in the power transmission apparatus 100. The first communication unit 206 includes a memory 206a. The memory 206a stores wireless power transfer record type definition (WPT RTD) data 400. A plurality of pieces of data compliant with the NDEF is stored in the WPT RTD data 400. Further, data necessary for executing wireless power transmission between the power transmission apparatus 100 and the electronic apparatus 200 is included in the WPT RTD data 400.

Authentication data used at least for performing authentication of the wireless power transmission with the power transmission apparatus 100 is stored in the WPT RTD data 400. The authentication data includes a record type name, data indicating a power transmission method supported by the electronic apparatus 200 and a power transmission control protocol, identification data of the electronic apparatus 200, power receiving capability data of the electronic apparatus 200, and data indicating a type of the tag included in the electronic apparatus 200. In the present exemplary embodiment, the record type name is data indicating a record type for identifying the contents and the structure of data stored in the WPT RTD data 400. The record type name is data for identifying the WPT RTD data 400. For example, the power receiving capability data is data indicating power receiving capability of the electronic apparatus 200, such as a maximum value of power receivable by the electronic apparatus 200.

The WPT RTD data 400 can also include power reception status data and power transmission status data. The power reception status data includes data indicating a state of the electronic apparatus 200. For example, the power reception status data includes a value of required power requesting to the power transmission apparatus 100, a value of power the electronic apparatus 200 has received from the power transmission apparatus 100, a remaining amount of the battery 211, data relating to charging of the battery 211, and error data relating to an error occurred in the electronic apparatus 200. Herein, the error data includes data indicating whether an error has occurred in the electronic apparatus 200 and data indicating a type of the error.

The power transmission status data includes data indicating a state of the power transmission apparatus 100. For example, the power transmission status data includes identification data of the power transmission apparatus 100, data indicating whether the power transmission apparatus 100 starts transmitting the transmission power to the electronic apparatus 200, and a power transmission parameter set to the power transmission apparatus 100.

The first communication unit 206 analyzes the data supplied from the rectification smoothing circuit 205. Then, the first communication unit 206 transmits data read from the WPT RTD data 400 to the power transmission apparatus 100 or writes data received from the power transmission apparatus 100 into the WPT RTD data 400 by using the analysis result of the data. The first communication unit 206 transmits response data corresponding to the data supplied from the rectification smoothing circuit 205 to the power transmission apparatus 100.

The first communication unit 206 performs processing for fluctuating the internal load of the first communication unit 206 in order to transmit the data read from the WPT RTD data 400 and the response data, to the power transmission apparatus 100.

The electronic apparatus 200 also includes a tag specified by the NFC standard. Hereinbelow, the tag included in the electronic apparatus 200 will be described with reference to FIG. 4. The control unit 201 can read the data stored in the WPT RTD data 400 via an internal bus interface (not illustrated). The control unit 201 can write data into the WPT RTD data 400 via the internal bus interface (not illustrated).

Figure 4:
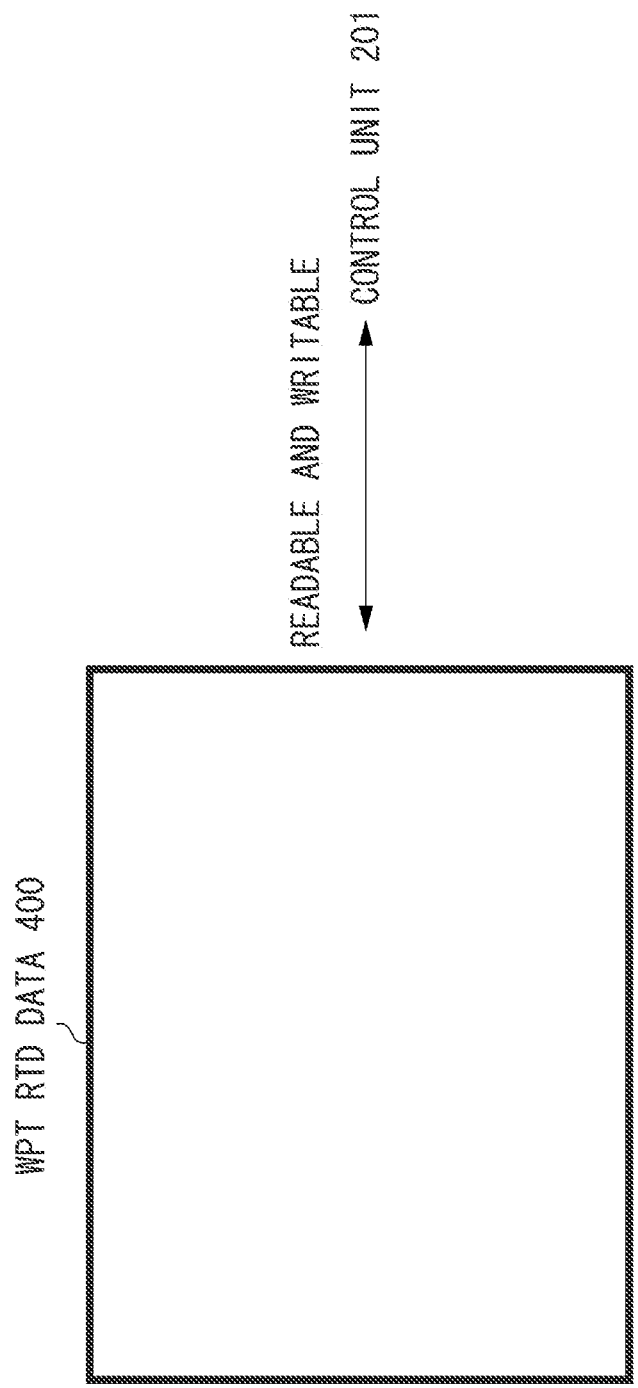
FIG. 4 is a diagram illustrating an example of a tag included in the electronic apparatus according to the first exemplary embodiment.

For example, the control unit 201 can control respective units of the electronic apparatus 200 by using the power transmission status data read from the WPT RTD data 400. For example, the control unit 201 can periodically detect the power reception status data by using the data supplied from the respective units of the electronic apparatus 200 to write the detected power reception status data into the WPT RTD data 400. In addition, the tag included in the electronic apparatus 200 can be referred to as an active tag or a dynamic tag. As illustrated in FIG. 4, when the electronic apparatus 200 includes a tag, the authentication data, the WPT RTD data 400 stores the power reception status data and the power transmission status data.

In addition, the power transmission apparatus 100 can read the data stored in the WPT RTD data 400 by using the first communication unit 106 included in the power transmission apparatus 100. In this case, the power transmission apparatus 100 can also write the data into the WPT RTD data 400 by using the first communication unit 106.

The power detection unit 207 detects the power received via the power reception antenna 203 and supplies data indicating the detected power to the control unit 201.

According to an instruction from the control unit 201, the regulator 208 supplies at least any one of the power supplied from the rectification smoothing circuit 205 or the power supplied from the battery 211 to the respective units of the electronic apparatus 200.

The load unit 209 includes an imaging circuit for generating video data such as still image data and moving image data from an optical image of an object and a reproduction circuit for reproducing the video data.

The charging unit 210 charges the battery 211. According to an instruction from the control unit 201, the charging unit 210 charges the battery 211 by using the power supplied from the regulator 208 or supplies power discharged from the battery 211 to the regulator 208. The charging unit 210 periodically detects the remaining amount of the battery 211 and provides data indicating the remaining amount of the battery 211 and data relating to charging of the battery 211 to the control unit 201.

The battery 211 can be connected to the electronic apparatus 200. The battery 211 is a rechargeable secondary battery, such as a lithium-ion battery. In addition, the battery 211 can be a battery other than the lithium-ion battery.

The temperature detection unit 212 detects temperature of the electronic apparatus 200 and provides data indicating the detected temperature to the control unit 201.

The memory 213 stores a computer program for controlling the electronic apparatus 200 and data such as parameters relating to the electronic apparatus 200.

The operation unit 214 provides a user interface for operating the electronic apparatus 200. The control unit 201 controls the electronic apparatus 200 according to an input signal received via the operation unit 214.

The second communication unit 215 carries out wireless communication with the power transmission apparatus 100. For example, the second communication unit 215 carries out wireless communication with the power transmission apparatus 100 based on the same communication standard as that of the second communication unit 113 included in the power transmission apparatus 100.

<State Transition Diagram of Power Transmission Apparatus 100>

Next, transition of the state of the power transmission apparatus 100 according to the present exemplary embodiment will be described with reference to FIG. 5. In state 500 in FIG. 5, the power transmission apparatus 100 is connected to an AC power source (not illustrated) although the power thereof is turned off. If a user operates the operation unit 110 to turn on the power of the power transmission apparatus 100 in a case where the power transmission apparatus 100 is in state 500, the power transmission apparatus 100 transitions to state 501.

In state 501, the power transmission apparatus 100 performs processing for detecting the WPT RTD data. If the power of the power transmission apparatus 100 is turned off in a state where the power transmission apparatus 100 is in state 501, the power transmission apparatus 100 transitions to state 500. If the power transmission apparatus 100 detects the WPT RTD data in state 501, the power transmission apparatus 100 transitions to state 502. In a state where the power transmission apparatus 100 does not detect the WPT RTD data for wireless power transmission, the power transmission apparatus 100 remains in state 501 until the WPT RTD data is detected.

In state 502, the power transmission apparatus 100 performs processing for analyzing the detected WPT RTD data. As a result of the analysis of the WPT RTD data, if the authentication of the wireless power transmission between the power transmission apparatus 100 and the electronic apparatus 200 has succeeded when the power transmission apparatus 100 is in state 502, the power transmission apparatus 100 transitions to state 503. If an error relating to the wireless power transmission has occurred when the power transmission apparatus 100 is in state 502, the power transmission apparatus 100 transitions to state 501. Herein, for example, the error relating to the wireless power transmission can be a communication error relating to the communication between the power transmission apparatus 100 and the electronic apparatus 200, an error relating to the electronic apparatus 200, or an authentication error relating to the authentication of wireless power transmission between the power transmission apparatus 100 and the electronic apparatus 200.

In state 503, the power transmission apparatus 100 performs processing for exchanging the status data necessary for carrying out the wireless power transmission with the electronic apparatus 200. When the power transmission apparatus 100 is in state 503, the power transmission apparatus 100 sends the power transmission status data to the electronic apparatus 200 and receives the power reception status data from the electronic apparatus 200. Then, if the status data exchange has been completed when the power transmission apparatus 100 is in state 503, the power transmission apparatus 100 transitions to state 504. If an error relating to the wireless power transmission has occurred when the power transmission apparatus 100 is in state 503, the power transmission apparatus 100 transitions to state 501. If the power transmission apparatus 100 detects that charging of the electronic apparatus 200 is completed in state 503, the power transmission apparatus 100 transitions to state 501.

In state 504, the power transmission apparatus 100 performs power transmission processing for supplying the transmission power to the electronic apparatus 200. If an error relating to the wireless power transmission has occurred when the power transmission apparatus 100 is in state 504, the power transmission apparatus 100 transitions to state 501 from state 504. The power transmission apparatus 100 transitions to state 501 when a predetermined time (power transmission period) has elapsed after the power transmission apparatus 100 starts outputting a predetermined transmission power in state 504.

<Control Processing>

Figure 6:
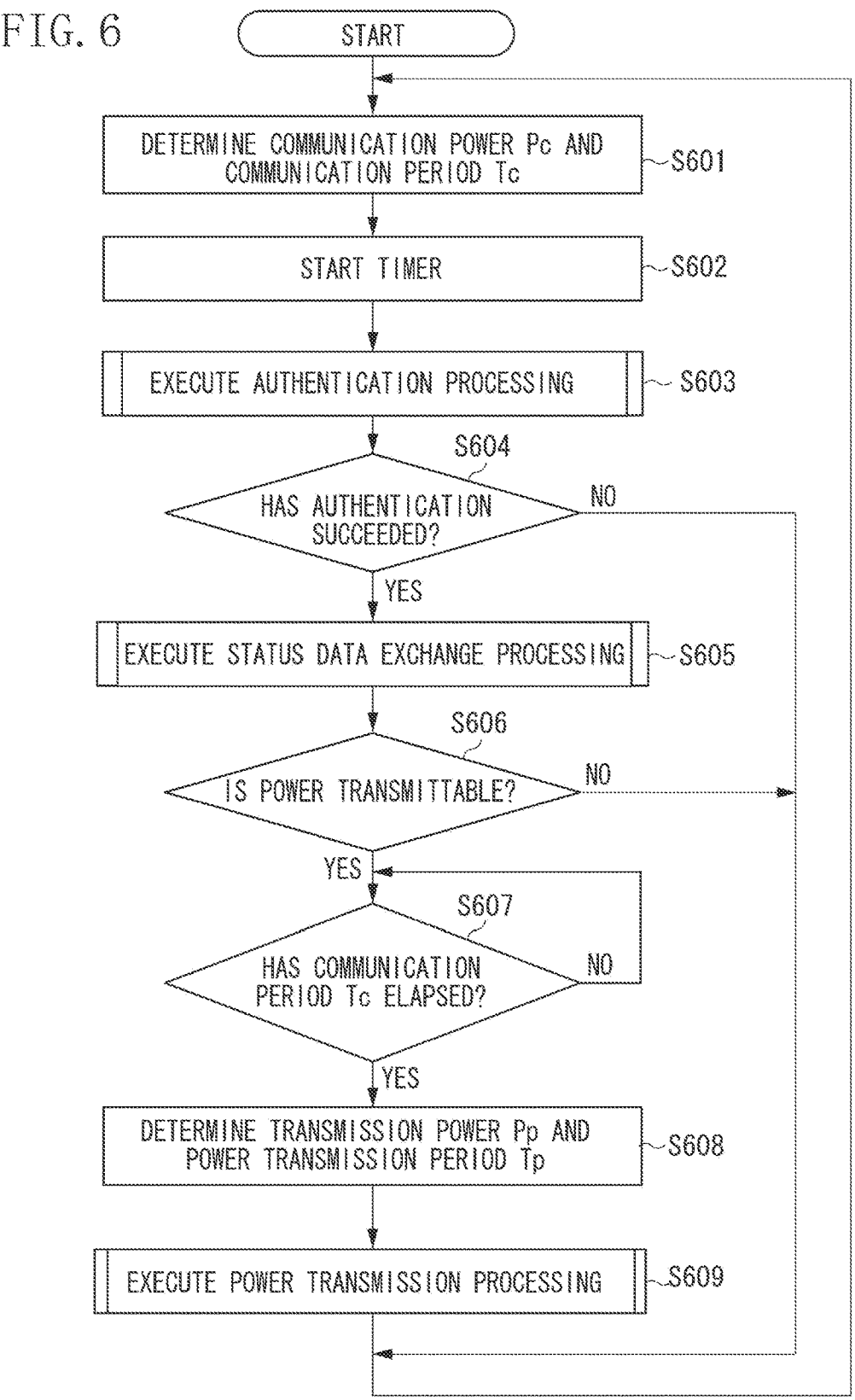
FIG. 6 is a flowchart illustrating an example of control processing performed by the power transmission apparatus according to the first exemplary embodiment.

Next, control processing for controlling the wireless power transmission of the power transmission apparatus 100 according to the present exemplary embodiment will be described with reference to the flowchart in FIG. 6. The control unit 101 can realize the control processing by executing a computer program stored in the memory 108.

The processing in this flowchart starts and proceeds to step S601 when the power of the power transmission apparatus 100 is turned on.

In step S601, the control unit 101 determines a communication power Pc (W) and a communication period Tc (sec). The control unit 101 also determines a magnetic field intensity Hc (A/m) at the time of communication described below. Then, the processing proceeds to step S602. For example, although a default value specified by the communication standard is set to the communication power Pc (W), the communication power Pc can be changed based on an allowable maximum magnetic field intensity and an allowable average magnetic field intensity described below. A determination method of the magnetic field intensity Hc (A/m) at the time of communication and the communication period Tc (sec) will be described below.

In step S602, the control unit 101 controls the timer 101a to measure time elapsed after the output of the communication power Pc. Then, the processing proceeds to step S603.

In step S603, the control unit 101 performs the authentication processing described below. After the authentication processing is performed, the processing proceeds to step S604.

In step S604, the control unit 101 determines whether the authentication of the wireless power transmission between the power transmission apparatus 100 and the electronic apparatus 200 has succeeded. Although the details are described below, when the authentication processing is performed in step S603, any one of an authentication success flag or an authentication failure flag is set to the memory 108. When the authentication success flag is set to the memory 108, the control unit 101 determines that authentication of the wireless power transmission has succeeded (YES in step S604), and the processing proceeds to step S605. When the authentication failure flag is set to the memory 108, the control unit 101 determines that authentication of the wireless power transmission has failed (NO in step S604), and the processing returns to step S601.

In step S605, the control unit 101 performs status data exchange processing described below. After the status data exchange processing is performed, the processing proceeds to step S606.

In step S606, the control unit 101 determines whether the power transmission apparatus 100 can transmit power to the electronic apparatus 200. Although details are described below, when the status data exchange processing is performed in step S605, any one of a power transmission enable flag or a power transmission disable flag is set to the memory 108. When the power transmission enable flag is set to the memory 108, the control unit 101 determines that the power transmission apparatus 100 can transmit power to the electronic apparatus 200 (YES in step S606), and the processing proceeds to step S607. When the power transmission disable flag is set to the memory 108, the control unit 101 determines that the power transmission apparatus 100 cannot transmit power to the electronic apparatus 200 (NO in step S606), and the processing returns to step S601.

In step S607, the control unit 101 determines whether the timer 101a controlled in step S602 has measured a lapse of the communication period Tc determined in step S601. If the communication period Tc has elapsed (YES in step S607), the processing proceeds to step S608. If the communication period Tc has not yet elapsed (NO in step S607), the processing returns to step S607, and the control unit 101 waits until the communication period Tc has elapsed.

In the present exemplary embodiment, although the communication period Tc is determined by the control unit 101 in step S601, the control unit 101 can determine a time actually taken to complete necessary communication to be the communication period Tc in step S607 instead of determining the communication period Tc in step S601.

Herein, there can be a method using a fixed value, a method using a measured value, and a method using a value based on the below-described allowable maximum magnetic field intensity and the allowable average magnetic field intensity for determining the communication period Tc. When a fixed value is used, the control unit 101 determines a predetermined value as the communication period Tc in step S601. If a measured value is used, as described above, the control unit 101 determines a time actually taken to complete necessary communication in step S607 as the communication period Tc. The determination method using a value based on the allowable maximum magnetic field intensity and the allowable average magnetic field intensity will be described below.

<Determination Method of Transmission Power and Power Transmission Period>

In step S608, the control unit 101 determines a transmission power Pp (W) and a power transmission period Tp (sec). A description of how the control unit 101 determines the transmission power Pp (W) and the power transmission period Tp (sec) will now be provided.

In step S608, the control unit 101 acquires a maximum magnetic field intensity (A/m) obtained by a proximity IC card (PICC) in a communicable range of the power transmission apparatus 100 and the electronic apparatus 200 when the power generation unit 103 outputs the communication power Pc determined in step S601. Then, this maximum magnetic field intensity is determined as the magnetic field intensity Hc (A/m) at the time of communication. The magnetic field intensity Hc (A/m) at the time of communication can be determined from the communication power Pc based on the data accumulated in the past.

Figure 11:
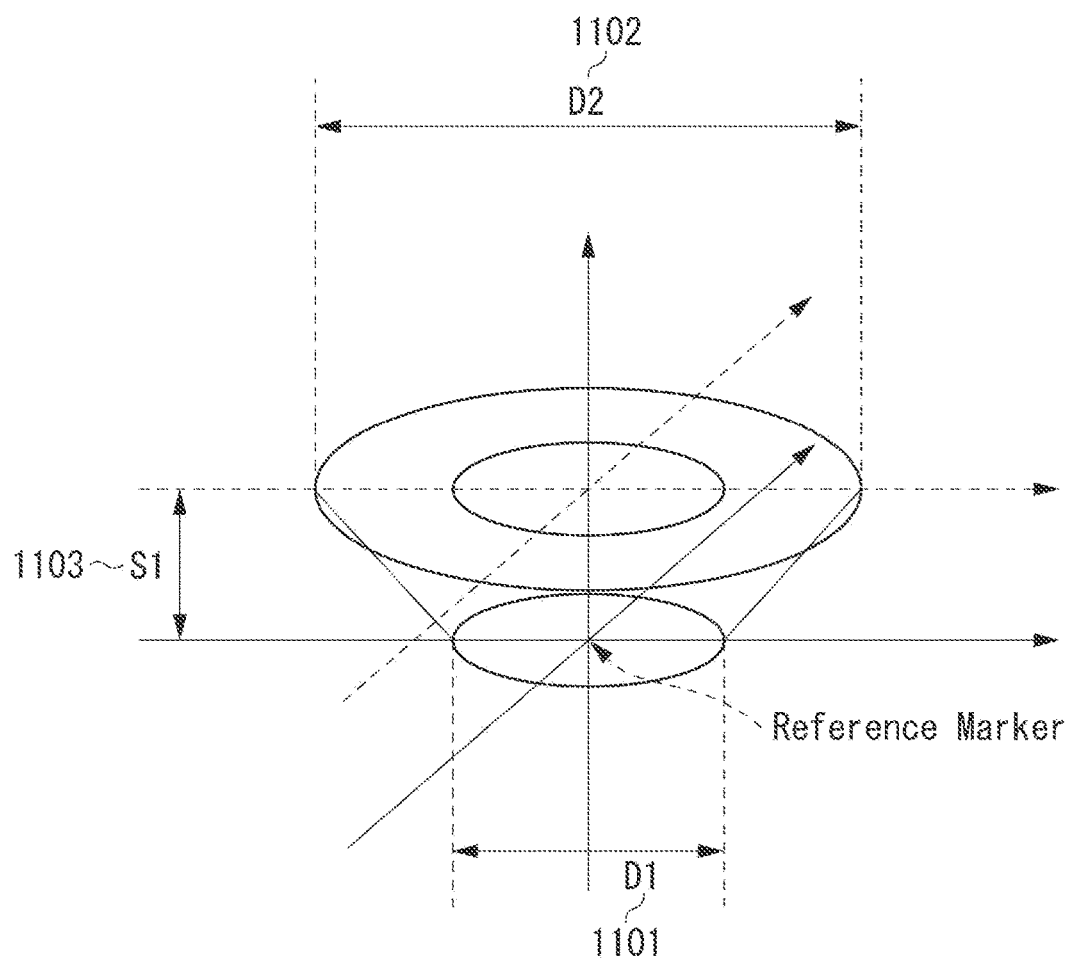
FIG. 11 is a diagram illustrating an example of a positional relationship between an antenna of the power transmission apparatus and an antenna of the electronic apparatus according to the first exemplary embodiment.

Herein, for example, the communicable range of the power transmission apparatus 100 and the electronic apparatus 200 can be a range in which the first communication unit 106 of the power transmission apparatus 100 can communicate with the first communication unit 206 of the electronic apparatus 200 as illustrated in FIG. 11.

FIG. 11 is a diagram illustrating a positional relationship of the center of the power reception antenna 203 of the electronic apparatus 200 when the center of the power transmission antenna 107 of the power transmission apparatus 100 is defined as a reference marker. For example, the communicable range can be a region having a diameter 1101 of 10 mm (D1=10 mm), a diameter 1102 of 20 mm (D2=20 mm), and a span 1103 of 5 mm (S1=5 mm). When the center of the power reception antenna 203 of the electronic apparatus 200 is placed within the region illustrated in FIG. 11, the first communication unit 106 of the power transmission apparatus 100 can communicate with the first communication unit 206 of the electronic apparatus 200.

The communication range specified by the NFC forum can be used as a communicable range of the power transmission apparatus 100 and the electronic apparatus 200.

The control unit 101 of the power transmission apparatus 100 can previously store a correspondence table of a power output setting and the maximum magnetic field intensity (A/m) which the PICC obtains in the communicable range of the power transmission apparatus 100 and the electronic apparatus 200 in the memory 108. In this case, the magnetic field intensity Hc (A/m) at the time of communication can be determined from the communication power Pc based on the correspondence table.

As described above, the maximum magnetic field intensity which the PICC obtains in the communicable range of the power transmission apparatus 100 and the electronic apparatus 200 when the power generation unit 103 outputs the communication power Pc determined in step S601 is defined as the magnetic field intensity Hc (A/m) at the time of communication.

Further, the maximum magnetic field intensity which the PICC obtains in the communicable range of the power transmission apparatus 100 and the electronic apparatus 200 when the power generation unit 103 outputs the transmission power Pp is defined as the magnetic field intensity Hp (A/m) at the time of power transmission. The magnetic field intensity Hp (A/m) at the time of power transmission can be determined as follows.

When the allowable maximum magnetic field intensity and the allowable average magnetic field intensity of the PICC in the communicable range of the power transmission apparatus 100 and the electronic apparatus 200 are respectively "$H_{max}$ (A/m)" and "$H_{avg}$ (A/m)", the control unit 101 determines the magnetic field intensity Hp at the time of power transmission and the power transmission period Tp to satisfy the following formulas "$Hp \leq H_{max}$" and "$(Hc \times Tc + Hp \times Tp)/(Tc+Tp) \leq H_{avg}$".

For example, when the allowable maximum magnetic field intensity $H_{max}$ and the allowable average magnetic field intensity $H_{avg}$ are respectively 12 A/m and 10 A/m ($H_{max}$=12 A/m, $H_{avg}$=10 A/m), the control unit 101 determines the magnetic field intensity Hp at the time of power transmission and the power transmission period Tp to satisfy the following formulas "$Hp \leq 12$" and "$(Hc \times Tc + Hp \times Tp)/(Tc+Tp) \leq 10$".

Next, with reference to FIGS. 12A and 12B, description will be given to an example in which the control unit 101 determines the magnetic field intensity Hp at the time of power transmission and the power transmission period Tp.

Figure 12A:
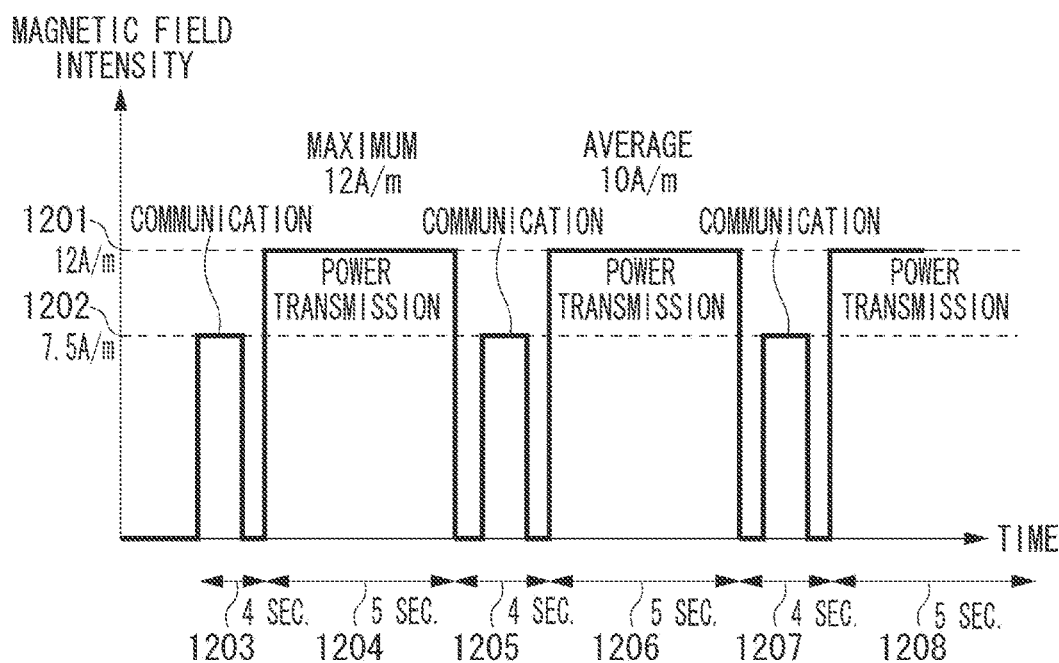
FIGS. 12A and 12B are diagrams illustrating examples of a magnetic field intensity at the time of communication and a magnetic field intensity at the time of power transmission according to the first exemplary embodiment.
Figure 12B:
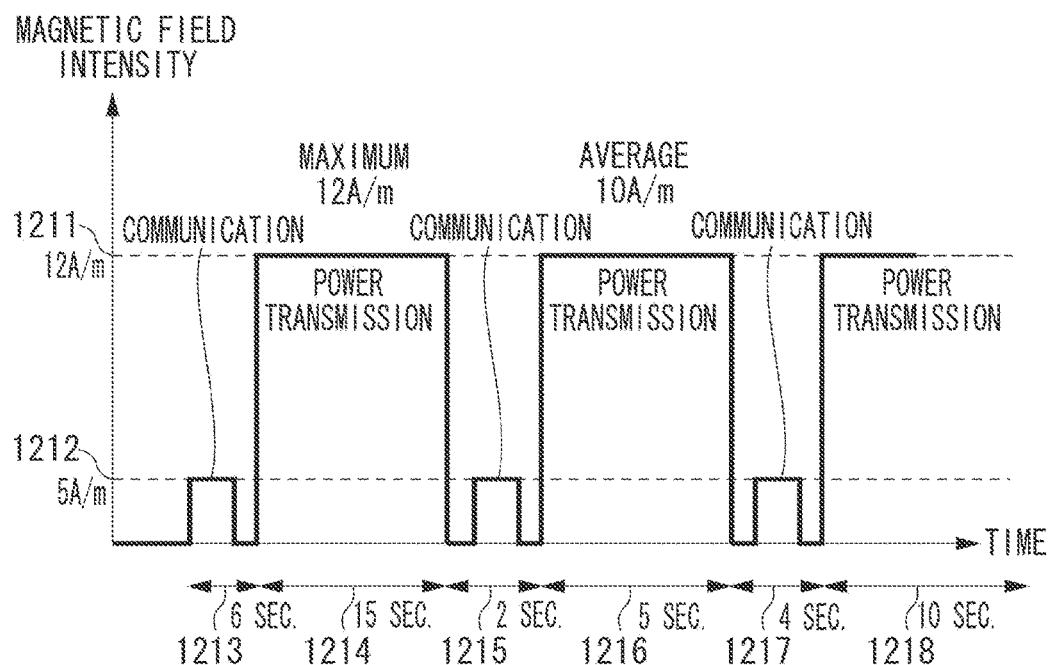

In FIGS. 12A and 12B, each of the vertical axes represents a magnetic field intensity (A/m) whereas each of the horizontal axes represents time (sec).

The example in FIG. 12A illustrates a state where the control unit 101 determines the communication period Tc as a fixed value of 4 seconds and the magnetic field intensity Hc at the time of communication as 7.5 A/m in step S601. In this example, in step S614, the control unit 101 determines the magnetic field intensity Hp at the time of power transmission as 12 A/m and the power transmission period Tp to be 5 seconds in order to satisfy the above-described formulas. In addition, the allowable maximum magnetic field intensity $H_{max}$ of the PICC is set to 12 A/m, whereas the allowable average magnetic field intensity $H_{avg}$ thereof is set to 10 A/m (i.e., $H_{max}$=12 A/m, $H_{avg}$=10 A/m).

In the example illustrated in FIG. 12A, the power transmission apparatus 100 executes power transmission for 5 seconds (time 1204) at the magnetic field intensity 1201 of 12 A/m after executing communication for 4 seconds (time 1203) at the magnetic field intensity 1202 of 7.5 A/m. Then, similarly, the power transmission apparatus 100 executes power transmission for 5 seconds (time 1206) at the magnetic field intensity 1201 of 12 A/m after executing communication for 4 seconds (time 1205) at the magnetic field intensity 1202 of 7.5 A/m. Then, similarly, the power transmission apparatus 100 executes power transmission for 5 seconds (time 1208) at the magnetic field intensity 1201 of 12 A/m after executing communication for 4 seconds (time 1207) at the magnetic field intensity 1202 of 7.5 A/m.

Hereinbelow, similarly, the transmission apparatus 100 alternately and repeatedly executes communication for 4 seconds at the magnetic field intensity 1202 of 7.5 A/m and power transmission for 5 seconds at the magnetic field intensity 1201 of 12 A/m.

In the example illustrated in FIG. 12B, the control unit 101 determines the magnetic field intensity Hc at the time of communication to be 5 A/m (magnetic field intensity 1212) in step S601, and it takes 6 seconds (time 1213, Tc=6) for the first communication. In this case, the communication period Tc is determined based on the measured value. In this example, in step S608, the control unit 101 determines the magnetic field intensity Hp at the time of power transmission to be 12 A/m (magnetic field intensity 1212) and the power transmission period Tp to be 15 seconds (time 1214) in order to satisfy the above-described formulas. In addition, the allowable maximum magnetic field intensity $H_{max}$ of the PICC is set to 12 A/m, whereas the allowable average magnetic field intensity $H_{avg}$ thereof is set to 10 A/m (i.e., $H_{max}$=12 A/m, $H_{avg}$=10 A/m). If it takes 2 seconds (time 1215, Tc=2) for next communication, the control unit 101 determines the next magnetic field intensity Hp at the time of next power transmission as 12 A/m (magnetic field intensity 1211) and the next power transmission period Tp as 5 seconds (time 1216). If it takes 4 seconds (time 1217, Tc=4) for following communications, the control unit 101 determines the next magnetic field intensity Hp at the time of next power transmission as 12 A/m (magnetic field intensity 1211) and the next power transmission period Tp to be 10 seconds (time 1218) in order to satisfy the above-described formulas.

The allowable maximum magnetic field intensity $H_{max}$ and the allowable average magnetic field intensity $H_{avg}$ are determined to be the values at which heat will not be generated from a foreign object even if the foreign object is inserted and the power transmission apparatus 100 repeatedly executes communication and power transmission. In the present exemplary embodiment, for example, the allowable maximum magnetic field intensity $H_{max}$ and the allowable average magnetic field intensity $H_{avg}$ are respectively set to 12 A/m and 10 A/m (i.e., $H_{max}$=12 A/m, $H_{avg}$=10 A/m). In the present exemplary embodiment, because the control unit 101 controls the magnetic field intensity Hp and the power transmission period Tp not to exceed the allowable maximum magnetic field intensity $H_{max}$ and the allowable average magnetic field intensity $H_{avg}$, safety for the inserted foreign object at the time of power transmission can be improved.

<Change Values of $H_{max}$ and $H_{avg}$ According to Elapsed Time>

In the examples illustrated in FIGS. 12A and 12B, after the power transmission apparatus 100 starts transmitting power, fixed values are set to both of the allowable maximum magnetic field intensity $H_{max}$ and the allowable average magnetic field intensity $H_{avg}$. However, variable values can be set thereto in order to further improve the safety at the time of power transmission with respect to the inserted foreign object.

Hereinbelow, with reference to FIGS. 13A and 13B, description will be given with respect to an example in which the allowable maximum magnetic field intensity $H_{max}$ and the allowable average magnetic field intensity $H_{avg}$ are changed after the power transmission apparatus 100 starts transmitting power.

First, as illustrated in FIGS. 12A and 12B, after the power transmission apparatus 100 starts transmitting power, the allowable maximum magnetic field intensity $H_{max}$ and the allowable average magnetic field intensity $H_{avg}$ are respectively set to 12 A/m and 10 A/m (i.e., $H_{max}$=12 A/m, $H_{avg}$=10 A/m).

Figure 13A:
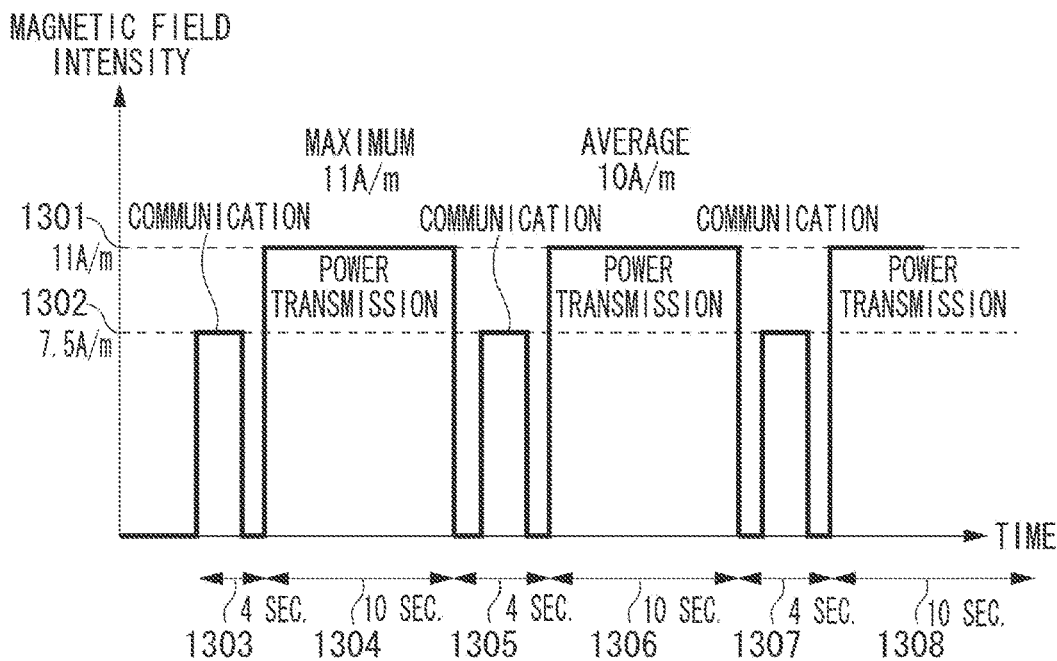
FIGS. 13A and 13B are diagrams illustrating examples of a magnetic field intensity at the time of communication and a magnetic field intensity at the time of power transmission according to the first exemplary embodiment.

The example in FIG. 13A illustrates a state where the allowable maximum magnetic field intensity $H_{max}$ is changed from 12 A/m to 11 A/m when a predetermined time has elapsed after the power transmission apparatus 100 starts transmitting power, and executes communication and power transmission repeatedly as illustrated in FIG. 12A. In addition, the allowable average magnetic field intensity $H_{avg}$ is kept to be 10 A/m. The example in FIG. 13A illustrates a state where the control unit 101 determines the communication period Tc to be 4 seconds and the magnetic field intensity Hc at the time of communication as 7.5 A/m in step S601. In this example, in step S608, the control unit 101 determines the magnetic field intensity Hp at the time of power transmission as 11 A/m and the power transmission period Tp to be 10 seconds in order to satisfy the above-described formulas.

In the example illustrated in FIG. 13A, when a predetermined time has elapsed after the power transmission apparatus 100 starts transmitting power, the power transmission apparatus 100 executes power transmission for 10 seconds (time 1304) at a magnetic field intensity 1301 of 11 A/m after executing communication for 4 seconds (time 1303) at a magnetic field intensity 1302 of 7.5 A/m. Then, similarly, the power transmission apparatus 100 executes power transmission for 10 seconds (time 1306) at the magnetic field intensity 1301 of 11 A/m after executing communication for 4 seconds (time 1305) at the magnetic field intensity 1302 of 7.5 A/m. Then, similarly, the power transmission apparatus 100 executes power transmission for 10 seconds (time 1308) at the magnetic field intensity 1301 of 11 A/m after executing communication for 4 seconds (time 1307) at the magnetic field intensity 1302 of 7.5 A/m.

Thereafter, similarly, the transmission apparatus 100 repeatedly executes power transmission for 10 seconds at the magnetic field intensity 1301 of 11 A/m after executing communication for 4 seconds at the magnetic field intensity 1302 of 7.5 A/m.

Figure 13B:
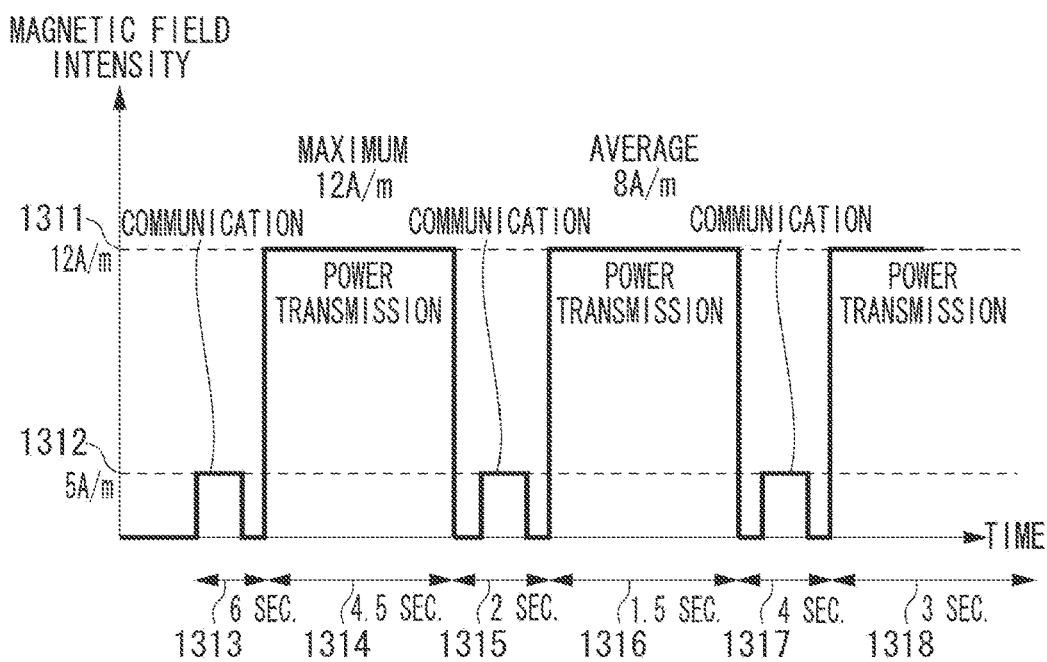

The example in FIG. 13B illustrates a state where the allowable average magnetic field intensity $H_{avg}$ is changed from 10 A/m to 8 A/m when a predetermined time has elapsed after the power transmission apparatus 100 starts transmitting power and executes communication and power transmission repeatedly as illustrated in FIG. 12B. In addition, the allowable maximum magnetic field intensity $H_{max}$ is kept to be 12 A/m.

In the example illustrated in FIG. 13B, the control unit 101 determines the magnetic field intensity Hc at the time of communication to be 5 A/m (magnetic field intensity 1312) in step S601 and it takes 6 seconds (time 1313, Tc=6) for the first communication. In this example, in step S614, the control unit 101 determines the magnetic field intensity Hp at the time of power transmission to be 12 A/m (magnetic field intensity 1311) and the power transmission period Tp to be 4.5 seconds (time 1314) in order to satisfy the above-described formulas. If it takes 2 seconds (time 1315, Tc=2) for next communication, the control unit 101 determines the next magnetic field intensity Hp at the time of power transmission to be 12 A/m (magnetic field intensity 1311) and the next power transmission period Tp to be 1.5 seconds (time 1316) in order to satisfy the above-described formulas. If it takes 4 seconds (time 1317, Tc=4) for following communications, the control unit 101 determines the next magnetic field intensity Hp at the time of next power transmission to be 12 A/m (magnetic field intensity 1311) and the next power transmission period Tp to be 3 seconds (time 1318) in order to satisfy the above-described formulas.

As described above, the safety at the time of power transmission with respect to the inserted foreign object can be improved by lowering any one or both of the values of the allowable maximum magnetic field intensity $H_{max}$ and the allowable average magnetic field intensity $H_{avg}$ according to the lapse of time after the power transmission apparatus 100 starts transmitting power.

For example, as illustrated in FIG. 12A or 12B, immediately after the power transmission apparatus 100 starts transmitting power, the allowable maximum magnetic field intensity $H_{max}$ and the allowable average magnetic field intensity $H_{avg}$ are respectively set to 12 A/m and 10 A/m ($H_{max}$=12 A/m, $H_{avg}$=10 A/m). Then, after one hour has elapsed, as illustrated in FIG. 13A or 13B, the control unit 101 changes the allowable maximum magnetic field intensity $H_{max}$ to 11 A/m ($H_{max}$=11 A/m) or the allowable average magnetic field intensity $H_{avg}$ to 8 A/m ($H_{avg}$=8 A/m), and determines the magnetic field intensity Hp at the time of power transmission and the power transmission period Tp.
<Change Values of $H_{max}$ and $H_{avg}$ According to Increase in Temperature>

The safety at the time of power transmission with respect to the inserted foreign object can be further improved by lowering any one or both of the values of the allowable maximum magnetic field intensity $H_{max}$ or the allowable average magnetic field intensity $H_{avg}$ according to the increase of temperature detected by the temperature detection unit 112 after the power transmission apparatus 100 starts transmitting power.

As illustrated in FIG. 12A or 12B, immediately after the power transmission apparatus 100 starts transmitting power, the allowable maximum magnetic field intensity $H_{max}$ and the allowable average magnetic field intensity $H_{avg}$ are set to 12 A/m and 10 A/m respectively ($H_{max}$=12 A/m, $H_{avg}$=10 A/m). Thereafter, as illustrated in FIG. 13A or 13B, when the temperature detected by the temperature detection unit 112 exceeds 50° C., the control unit 101 changes the allowable maximum magnetic field intensity $H_{max}$ to 11 A/m ($H_{max}$=11 A/m) or changes the allowable average magnetic field intensity $H_{avg}$ to 8 A/m ($H_{avg}$=8 A/m), and determines the magnetic field intensity Hp at the time of power transmission and the power transmission period Tp.

Further, in the example illustrated in FIG. 13A, although the magnetic field intensity Hc at the time of communication and the communication period Tc are not changed even if the allowable maximum magnetic field intensity $H_{max}$ and the allowable average magnetic field intensity $H_{avg}$ are changed, the magnetic field intensity Hc at the time of communication and the communication period Tc can also be changed. For example, when the allowable maximum magnetic field intensity $H_{max}$ or the allowable average magnetic field intensity $H_{avg}$ is reduced, in step S601, the control unit 101 can lower the magnetic field intensity Hc at the time of communication by lowering the communication power Pc, or can shorten the communication period Tc according to the reduced amount thereof. Further, in the case of the example illustrated in FIG. 13B, the magnetic field intensity Hc at the time of communication can be lowered if the allowable maximum magnetic field intensity $H_{max}$ or the allowable average magnetic field intensity $H_{avg}$ is reduced.

When the magnetic field intensity Hp at the time of power transmission is determined through the above-described procedure, the control unit 101 determines the transmission power Pp from the magnetic field intensity Hp at the time of power transmission. The transmission power Pp can be determined from the magnetic field intensity Hp at the time of power transmission based on the data accumulated in the past. The control unit 101 can determine the transmission power Pp based on a correspondence table of the magnetic field intensity Hp at the time of power transmission and the transmission power Pp previously stored in the memory 108.

As described above, after the control unit 101 determines the transmission power Pp and the power transmission period Tp from the magnetic field intensity Hp at the time of power transmission in step S608, the processing proceeds to step S609.

In step S609, the control unit 101 executes power transmission processing described below. After the power transmission processing is executed, the processing returns to step S601.
<Authentication Processing>

Next, the authentication processing according to the present exemplary embodiment, which is executed by the control unit 101 in step S603 of FIG. 6, will be described with reference to the flowchart illustrated in FIG. 7. The control unit 101 can realize the authentication processing by executing a computer program stored in the memory 108.

In step S701, the control unit 101 controls the power transmission unit 102 to output the communication power Pc. The control unit 101 controls the communication power Pc to be output through the power transmission antenna 107 until the processing for outputting the transmission power Pp is started. Then, the processing proceeds to step S702.

In step S702, the control unit 101 controls the first communication unit 106 to transmit data for requesting the authentication data to the electronic apparatus 200. Then, the processing proceeds to step S703.

In step S703, the control unit 101 determines whether the WPT RTD data 400 is detected. More specifically, when the first communication unit 106 receives the authentication data from the electronic apparatus 200, the control unit 101 acquires a record type name of the electronic apparatus 200 from the authentication data of the electronic apparatus 200. Then, the control unit 101 determines whether the WPT RTD data 400 is detected based on the record type name of the electronic apparatus 200. Based on the determination, if the WPT RTD data 400 is detected (YES in step S703), the processing proceeds to step S704. If the WPT RTD data 400 is not detected (NO in step S703), the processing returns to step S702. In addition, the processing also returns to step S702 if the first communication unit 106 does not receive the authentication data from the electronic apparatus 200.

In step S704, the control unit 101 analyzes the WPT RTD data 400 of the electronic apparatus 200 by checking the data included in the authentication data of the electronic apparatus 200. Then, the processing proceeds to step S705.

In step S705, the control unit 101 detects whether a communication error has occurred in the authentication data of the electronic apparatus 200 by using the analysis result acquired in step S704. If the communication error is detected in the authentication data of the electronic apparatus 200 (YES in step S705), the processing proceeds to step S706. If the communication error is not detected in the authentication data of the electronic apparatus 200 (NO in step S705), the processing proceeds to step S708.

In step S706, the control unit 101 displays, on the display unit 109, data indicating that an error is detected in the communication between the power transmission apparatus 100 and the electronic apparatus 200. Then, the processing proceeds to step S707.

In step S707, the control unit 101 sets an authentication failure flag to the memory 108. Then, the processing of this flowchart ends, and the processing proceeds to step S604 in FIG. 6.

In step S708, the control unit 101 determines whether the electronic apparatus 200 complies with the power transmission apparatus 100 by using the analysis result acquired in step S704.

For example, if the power transmission method supported by the power transmission apparatus 100 and the power transmission method supported by the electronic apparatus 200 coincide with each other, the control unit 101 determines that the electronic apparatus 200 complies with the power transmission apparatus 100. If the power transmission method supported by the power transmission apparatus 100 and the power transmission method supported by the electronic apparatus 200 do not coincide with each other, the control unit 101 determines that the electronic apparatus 200 does not comply with the power transmission apparatus 100.

For example, if the power transmission control protocol supported by the power transmission apparatus 100 and the power transmission control protocol supported by the electronic apparatus 200 coincide with each other, the control unit 101 determines that the electronic apparatus 200 complies with the power transmission apparatus 100. If the power transmission control protocol supported by the power transmission apparatus 100 and the power transmission control protocol supported by the electronic apparatus 200 do not coincide with each other, the control unit 101 determines that the electronic apparatus 200 does not comply with the power transmission apparatus 100.

Based on a result of the determination in step S708, if the electronic apparatus 200 does not comply with the power transmission apparatus 100 (NO in step S708), the processing proceeds to step S709. If the electronic apparatus 200 complies with the power transmission apparatus 100 (YES in step S708), the processing proceeds to step S710.

In step S709, the control unit 101 displays data indicating that an error is detected in the authentication between the power transmission apparatus 100 and the electronic apparatus 200 on the display unit 109. Then, the processing proceeds to step S707.

In step S710, the control unit 101 sets an authentication success flag to the memory 108. Then, the processing of this flowchart ends, and the processing proceeds to step S604 in FIG. 6.

In addition, the control unit 101 can execute processing specified in the NFC digital protocol of the NFC standard between steps S701 and S702. The control unit 101 can set the authentication failure flag if the WPT RTD data 400 cannot be detected even if a predetermined time has elapsed after requesting the authentication data in step S702.

<Status Data Exchange Processing>

Figure 8:
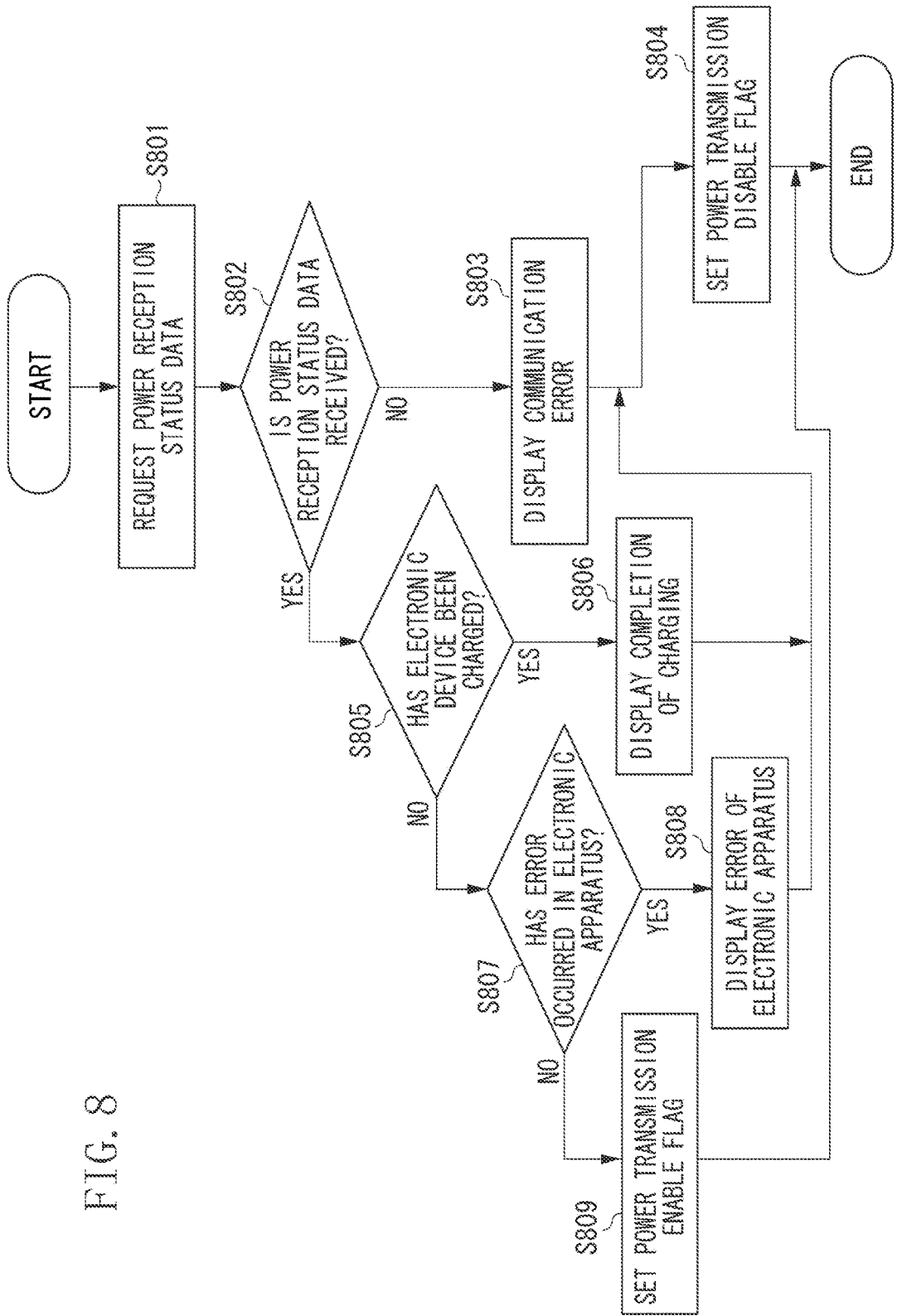
FIG. 8 is a flowchart illustrating an example of status data exchange processing performed by the power transmission apparatus according to the first exemplary embodiment.

Next, the status data exchange processing according to the present exemplary embodiment, which is executed by the control unit 101 in step S605 of FIG. 6, will be described with reference to the flowchart in FIG. 8. The control unit 101 can realize the status data exchange processing by executing a computer program stored in the memory 108.

In step S801, the control unit 101 controls the first communication unit 106 to transmit data for requesting the power reception status data to the electronic apparatus 200. Herein, the power transmission status data is included in the data for requesting the power reception status data. Then, the processing proceeds to step S802.

In step S802, the control unit 101 determines whether the first communication unit 106 receives the power reception status data from the electronic apparatus 200 before a predetermined time has elapsed after the power reception status data is requested to the electronic apparatus 200. If the control unit 101 determines that the first communication unit 106 receives the power reception status data from the electronic apparatus 200 (YES in step S802), the processing proceeds to step S805. If the control unit 101 determines that the first communication unit 106 has not received the power reception status data from the electronic apparatus 200 even if a predetermined time has elapsed after the power reception status data is requested (NO in step S802), the processing proceeds to step S803.

Figure 7:
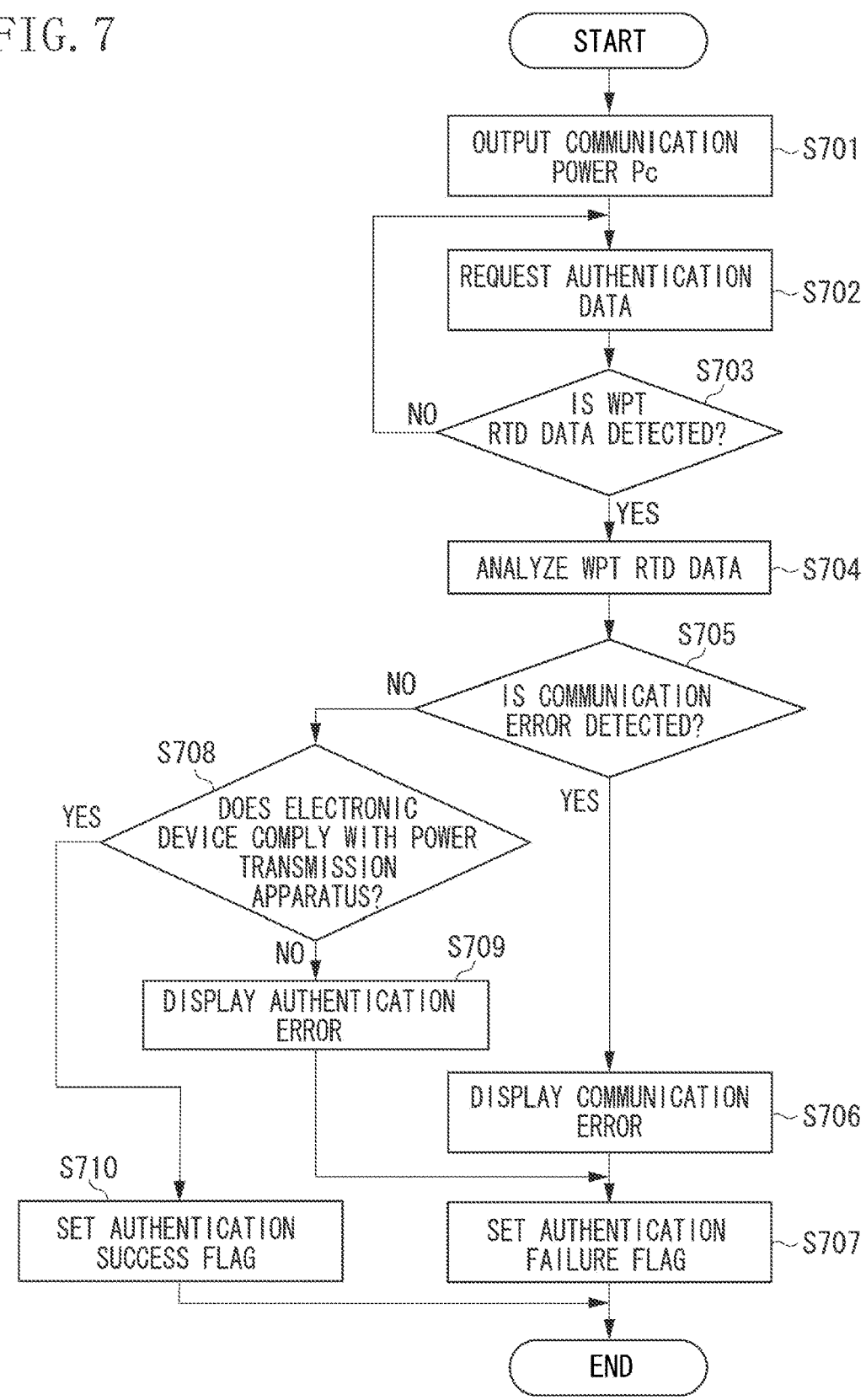
FIG. 7 is a flowchart illustrating an example of authentication processing performed by the power transmission apparatus according to the first exemplary embodiment.

In step S803, similar to the processing in step S706 in FIG. 7, the control unit 101 displays, on the display unit 109, data indicating that a communication error is detected. Then, the processing proceeds to step S804.

In step S804, the control unit 101 sets a power transmission disable flag to the memory 108. Then, the processing of this flowchart ends, and the processing proceeds to step S606 in FIG. 6.

In step S805, the control unit 101 determines whether the electronic apparatus 200 has been charged by using the power reception status data received by the first communication unit 106. If the control unit 101 determines that the electronic apparatus 200 has been charged (YES in step S805), the processing proceeds to step S806. If the control unit 101 determines that the electronic apparatus 200 has not been charged (NO in step S805), the processing proceeds to step S807.

In step S806, the control unit 101 displays, on the display unit 109, data indicating that the electronic apparatus 200 has been charged. At this time, the control unit 101 can also display data indicating that the battery 211 is fully charged on the display unit 109. Then, the processing proceeds to step S804.

In step S807, the control unit 101 determines whether an error has occurred in the electronic apparatus 200 by using the power reception status data received by the first communication unit 106. For example, the control unit 101 determines whether the error has occurred in the electronic apparatus 200 by detecting error data from the power reception status data of the electronic apparatus 200 and analyzing that error data.

If the control unit 101 determines that the error has occurred in the electronic apparatus 200 (YES in step S807), the processing proceeds to step S808. If the control unit 101 determines that the error has not occurred in the electronic apparatus 200 (NO in step S807), the processing proceeds to step S809.

In step S808, the control unit 101 displays, on the display unit 109, data indicating that the error has occurred in the electronic apparatus 200. The control unit 101 can further display data indicating a type of the error having occurred in the electronic apparatus 200 on the display unit 109. Then, the processing proceeds to step S804.

In step S809, the control unit 101 sets a power transmission enable flag to the memory 108. Then, the processing of this flowchart ends, and the processing proceeds to step S606 in FIG. 6.

<Power Transmission Processing>

Figure 9:
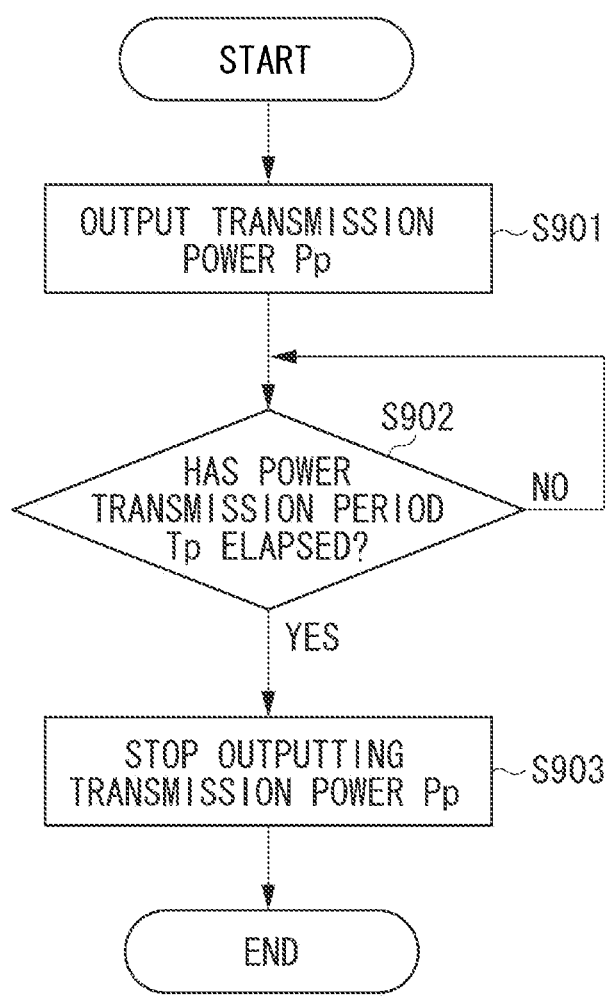
FIG. 9 is a flowchart illustrating an example of power transmission processing performed by the power transmission apparatus according to the first exemplary embodiment.

Next, power transmission processing according to the present exemplary embodiment, which is executed by the control unit 101 in step S609 of FIG. 6, will be described with reference to the flowchart in FIG. 9. The control unit 101 can realize the power transmission processing by executing a computer program stored in the memory 108.

In step S901, the control unit 101 controls the power transmission unit 102 to output power corresponding to the transmission power Pp determined in step S608. The control unit 101 controls the timer 101a to measure the time elapsed after the power corresponding to the transmission power Pp is output. Then, the processing proceeds to step S902.

In step S902, based on the time measured by the timer 101a, the control unit 101 determines whether the power transmission period Tp has elapsed after the power corresponding to the transmission power Pp is output. If the time measured by the timer 101a is greater than or equal to the power transmission period Tp, the control unit 101 determines that the power transmission period Tp has elapsed after the transmission power Pp is output (YES in step S902), and the processing proceeds to step S903. If the time measured by the timer 101a is less than the power transmission period Tp, the control unit 101 determines that the power transmission period Tp has not elapsed after the transmission power Pp is output (NO in step S902), and the processing returns to step S902.

In step S903, the control unit 101 controls the power transmission unit 102 to stop outputting the transmission power Pp. Then, the processing of this flowchart ends, and the processing returns to step S601 in FIG. 6.

<Processing Flow of Electronic Apparatus>

Figure 10:
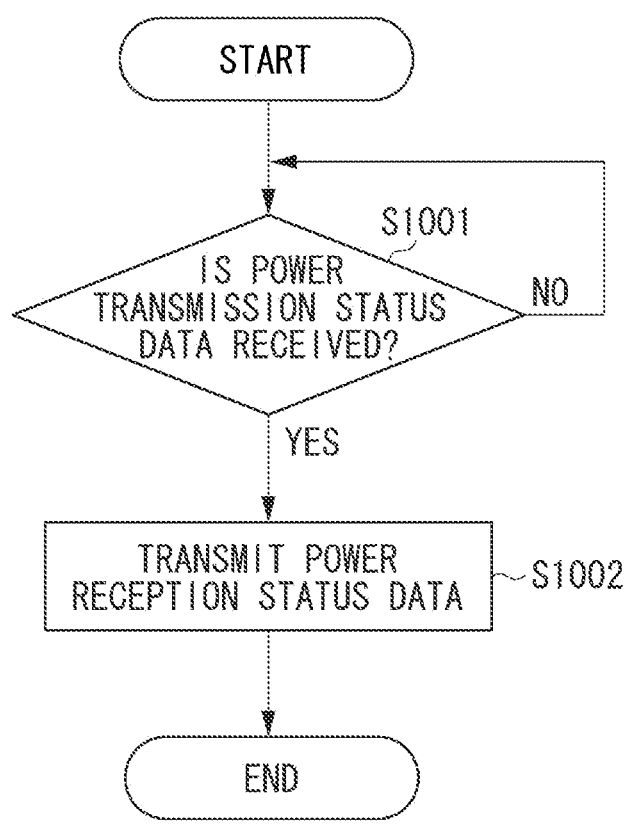
FIG. 10 is a flowchart illustrating an example of control processing performed by the electronic apparatus according to the first exemplary embodiment.

Next, control processing for controlling the wireless power transmission of the electronic apparatus 200 according to the present exemplary embodiment will be described with reference to a flowchart in FIG. 10. The control unit 201 can realize the control processing by executing a computer program stored in the memory 213.

Figure 5:
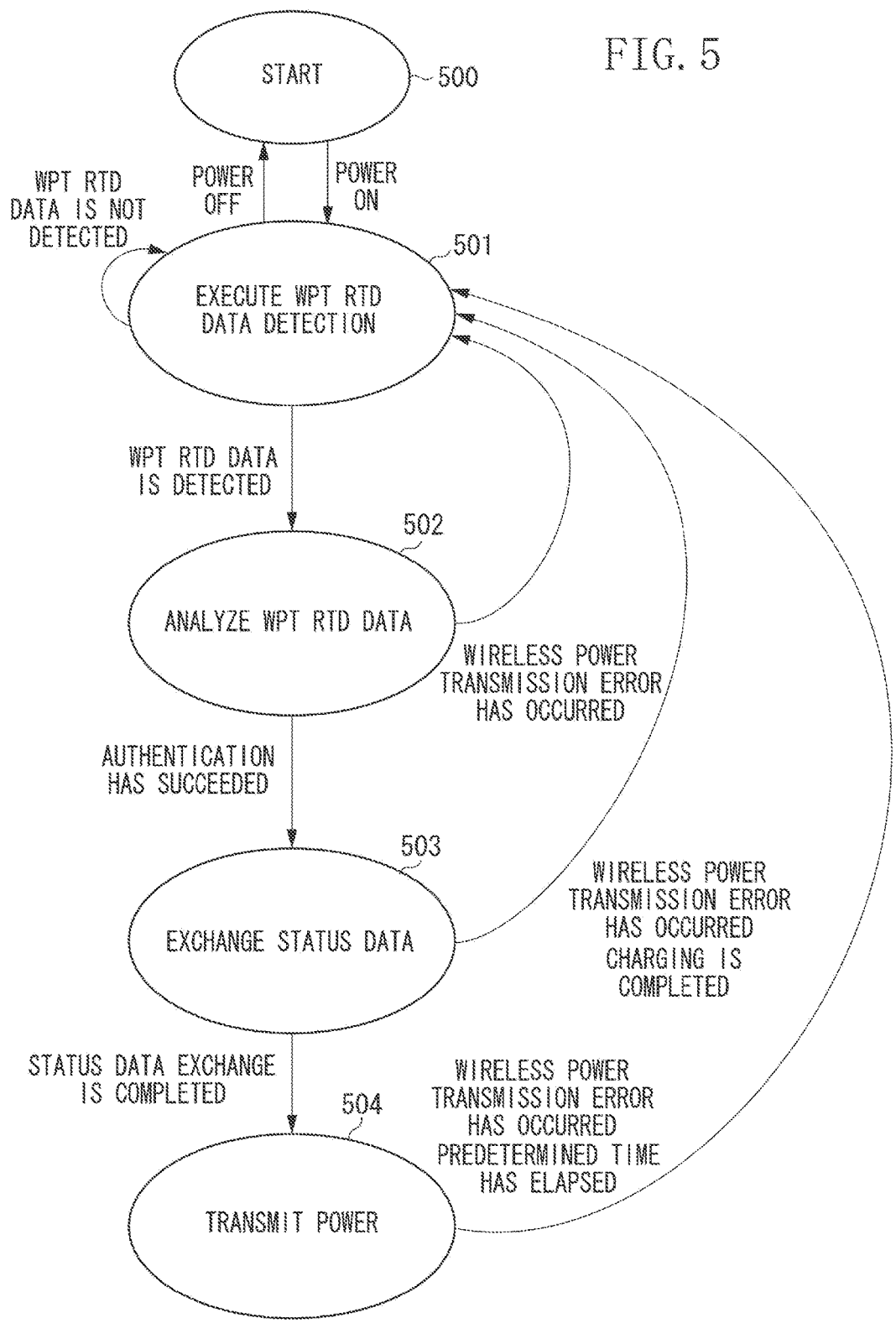
FIG. 5 is a diagram illustrating an example of state transition of the power transmission apparatus according to the first exemplary embodiment.

This processing is started when the power transmission apparatus 100 and the electronic apparatus 200 transition to state 503 of exchanging the status data in FIG. 5.

In step S1001, the control unit 201 controls the first communication unit 206 to determine whether the power transmission status data is received from the power transmission apparatus 100.

Data indicating a state of the power transmission apparatus 100 is included in the power transmission status data. For example, the power transmission status data includes identification data of the power transmission apparatus 100, data indicating whether the power transmission apparatus 100 starts transmitting the transmission power to the electronic apparatus 200, and a power transmission parameter set to the power transmission apparatus 100.

If the power transmission status data is received (YES in step S1001), the processing proceeds to step S1002. If the power transmission status data is not received (NO in step S1001), the processing returns to step S1001, and the control unit 201 waits until the power transmission status data is received.

In step S1002, the control unit 201 controls the first communication unit 206 to transmit the power reception status data to the power transmission apparatus 100. Herein, the power reception status data includes data indicating a state of the electronic apparatus 200. For example, the power reception status data includes a value of required power requesting to the power transmission apparatus 100, a value of power received by the electronic apparatus 200 from the power transmission apparatus 100, data relating to a remaining amount or charging of the battery 211, and error data relating to an error of the electronic apparatus 200. The error data includes data indicating whether an error has occurred in the electronic apparatus 200 and data indicating a type of the error.

Thereafter, the processing in the present flowchart ends.

In the present exemplary embodiment, although the power transmission apparatus 100 supplies communication power to the electronic apparatus 200 and executing communication between the first communication unit 106 and the electronic apparatus 200 both by using the power transmission antenna 107, the present embodiment is not limited thereto. For example, the power transmission apparatus 100 can include one antenna for supplying a predetermined transmission power to the electronic apparatus 200 and another antenna for executing communication between the first communication unit 106 and the electronic apparatus 200.

Although the electronic apparatus 200 receives power from the power transmission apparatus 100 and executing communication between the first communication unit 206 and the power transmission apparatus 100 both by using the power reception antenna 203, the present embodiment is not limited thereto. For example, the electronic apparatus 200 can include one antenna for receiving the transmission power from the power transmission apparatus 100 and another antenna for executing communication between the first communication unit 206 and the power transmission apparatus 100.

Although description of the exemplary embodiment in which the first communication unit 106 operates as a reader/writer specified by the NFC standard has been provided, the present embodiment is not limited thereto. For example, the first communication unit 106 can operate as a device that executes peer-to-peer (P2P) communication specified by the NFC standard.

A personal computer, a microcomputer, or a CPU can realize the various functions, processing, and methods described in the first exemplary embodiment by executing a program. In a second exemplary embodiment, a personal computer, a microcomputer, or a CPU is called as "computer X". In the present exemplary embodiment, a program for controlling the computer X to realize the various functions, processing, and methods described in the first exemplary embodiment is called as "program Y".

The computer X can realize the various functions, processing, and methods described in the first exemplary embodiment by executing the program Y. In this case, the program Y is supplied to the computer X via a computer-readable storage medium. A computer-readable storage medium according to the present exemplary embodiment includes at least any one of a hard disk device, a magnetic storage device, an optical storage device, a magneto-optical storage device, a memory card, a volatile memory, or a non-volatile memory. The computer-readable storage medium according to the present exemplary embodiment is a non-transitory storage medium.

OTHER EMBODIMENTS

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-209313, filed Oct. 23, 2015, which is hereby incorporated by reference herein in its entirety.

What is claimed is:

1. A power transmission apparatus comprising:
a communication interface configured to execute communication with an electronic apparatus;
a power transmitter configured to wirelessly supply power to the electronic apparatus; and
a controller configured to control communication executed by the communication interface and power supply executed by the power transmitter to be executed alternately,
wherein the controller adjusts communication power of the communication interface and transmission power of the power transmitter and/or a length of a communication period and a length of a power transmission period so that an average magnetic field intensity does not exceed a first magnetic field intensity in a predetermined region throughout the communication period of communication executed by the communication interface and the power transmission period of power transmission executed by the power transmitter;
wherein the controller adjusts the communication power of the communication interface and the transmission power of the power transmitter and/or the length of the communication period and the length of the power transmission period so that a maximum magnetic field intensity does not exceed a second magnetic field intensity in the predetermined region throughout the communication period of communication executed by the communication interface and the power transmission period of power transmission executed by the power transmitter, and
wherein the first magnetic field intensity is set to 10 A/m and the second magnetic field intensity is set to 12 A/m.

2. The power transmission apparatus according to claim 1, wherein the controller reduces the first magnetic field intensity or the second magnetic field intensity according to a lapse of time from a start of the power transmission executed by the power transmitter.

3. The power transmission apparatus according to claim 1, further comprising a temperature detection sensor configured to detect a temperature of the power transmission apparatus,
wherein the controller reduces the first magnetic field intensity or the second magnetic field intensity according to an increase of the temperature detected by the temperature detection sensor.

4. The power transmission apparatus according to claim 1, wherein the predetermined region is a region where the communication interface can communicate with the electronic apparatus.

5. The power transmission apparatus according to claim 1 further comprising an antenna,
wherein the communication interface wirelessly communicates with the electronic apparatus via the antenna, and
wherein the power transmitter wirelessly supplies power to the electronic apparatus via the antenna.

6. The power transmission apparatus according to claim 1, wherein the communication interface executes communication based on a specification specified by a near field communication standard.

7. The power transmission apparatus according to claim 1, wherein the communication interface operates as a reader/writer.

8. A control method for a power transmission apparatus including a communication interface for executing communication with an electronic apparatus and a power transmitter for wirelessly supplying power to the electronic apparatus, the control method comprising:
controlling communication executed by the communication interface and power supply executed by the power transmitter to be executed alternately;
adjusting communication power of the communication interface and transmission power of the power transmitter and/or a length of a communication period and a length of a power transmission period so that average magnetic field intensity does not exceed a first magnetic field intensity in a predetermined region throughout the communication period of communication executed by the communication interface and the power transmission period of power transmission executed by the power transmitter; and
adjusting the communication power of the communication interface and the transmission power of the power transmitter and/or the length of the communication period and the length of the power transmission period so that a maximum magnetic field intensity does not exceed a second magnetic field intensity in the predetermined region throughout the communication period of communication executed by the communication interface and the power transmission period of power transmission executed by the power transmitter,
wherein the first magnetic field intensity is set to 10 A/m and the second magnetic field intensity is set to 12 A/m.

9. The control method according to claim 8, further comprising reducing the first magnetic field intensity or the second magnetic field intensity according to a lapse of time from a start of the power transmission executed by the power transmitter.

10. The control method according to claim 8, further comprising detecting a temperature of the power transmission apparatus, wherein the first magnetic field intensity or the second magnetic field intensity is reduced according to detection of an increase of the temperature.

11. The control method according to claim 8, wherein the predetermined region is a region where the communication interface unit can communicate with the electronic apparatus.

12. The control method according to claim 8, wherein communication executed by the communication interface is based on a specification specified by a near field communication standard.

13. A non-transitory computer-readable storage medium storing computer executable instructions for causing a power transmission apparatus including a communication interface unit configured to communicate with an electronic apparatus and a power transmitter configured to wirelessly supply power to the electronic apparatus to execute a control method, the control method comprising:
controlling communication executed by the communication interface and power supply executed by the power transmitter to be executed alternately;
adjusting communication power of the communication interface and transmission power of the power transmitter and/or a length of a communication period and a length of a power transmission period so that average magnetic field intensity does not exceed a first magnetic field intensity in a predetermined region throughout the communication period of communication executed by the communication interface and the power transmission period of power transmission executed by the power transmitter; and adjusting the communication power of the communication interface and the transmission power of the power transmitter and/or the length of the communication period and the length of the power transmission period so that a maximum magnetic field intensity does not exceed a second magnetic field intensity in the predetermined region throughout the communication period of communication executed by the communication interface and the power transmission period of power transmission executed by the power transmitter, wherein the first magnetic field intensity is set to 10 A/m and the second magnetic field intensity is set to 12 A/m.

* * * * *